Jan. 19, 1954    C. J. BORKOWSKI    2,666,865
SURVEY INSTRUMENT
Filed May 16, 1947    3 Sheets-Sheet 1
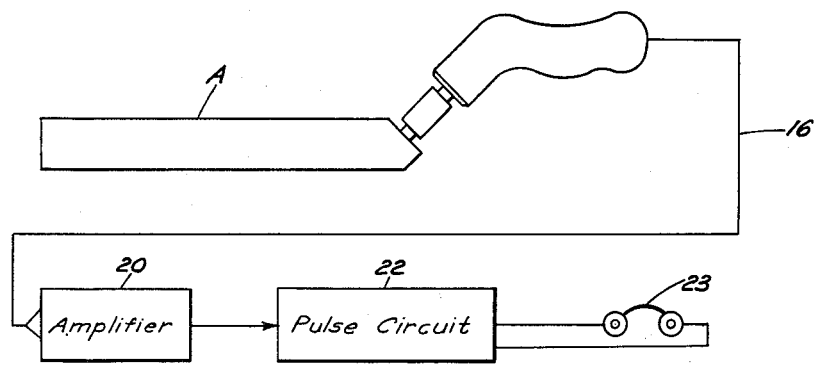
_FIG. 1._
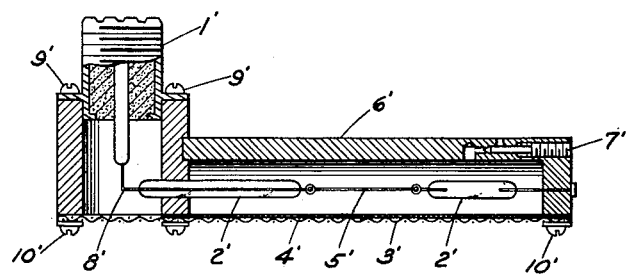
_FIG. 6._
Inventor
Casimer J. Borkowski
By Robert A. Lavender
Attorney

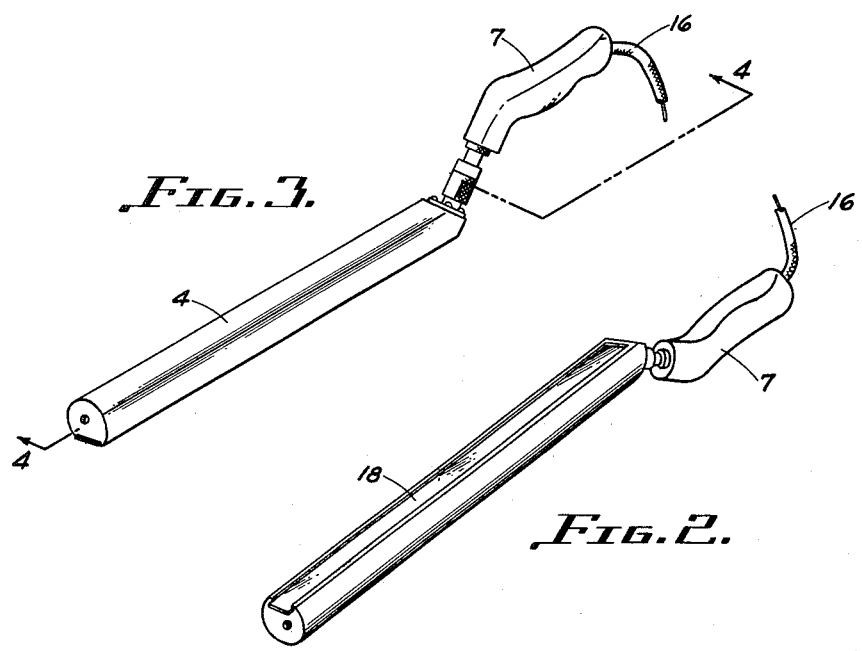
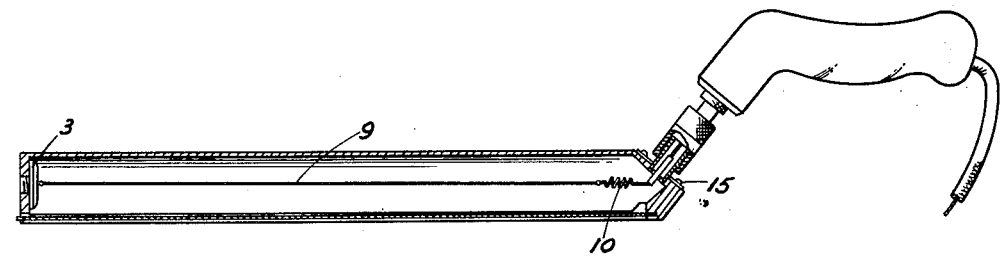

Jan. 19, 1954     C. J. BORKOWSKI     2,666,865
SURVEY INSTRUMENT
Filed May 16, 1947     3 Sheets-Sheet 3
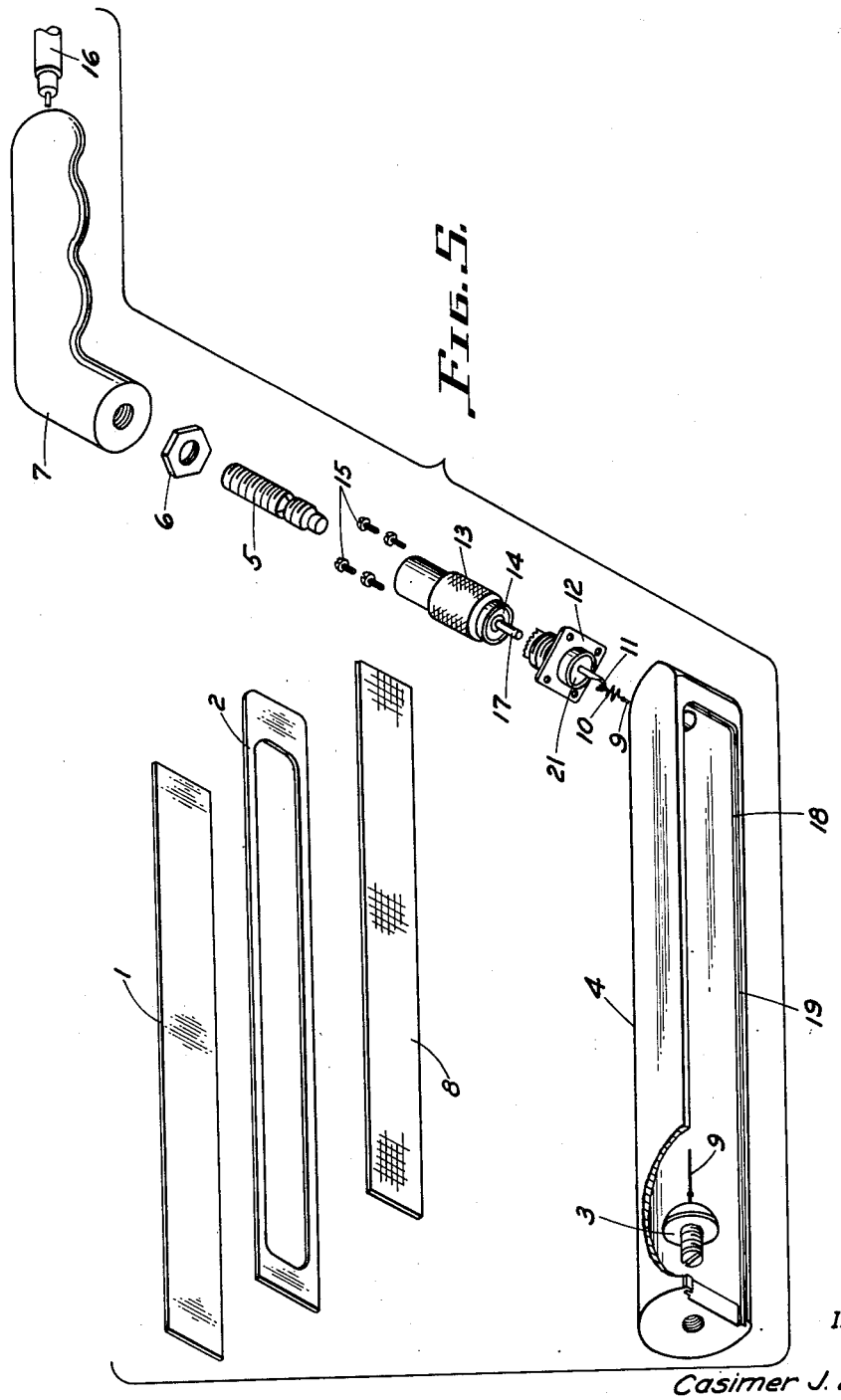
INVENTOR.
Casimer J. Borkowski Patented Jan. 19, 1954

2,666,865

UNITED STATES PATENT OFFICE 2,666,865

SURVEY INSTRUMENT

Casimer J. Borkowski, Oak Ridge, Tenn., assignor to the United States of America as represented by the United States Atomic Energy Commission Application May 16, 1947, Serial No. 748,433

2 Claims. (Cl. 313—93)

My invention relates to radiation detection, and survey equipment, and more particularly to a pulse type of survey instrument for detecting the presence of alpha particles, beta particles, gamma rays, and slow and fast neutrons, and which facilitates rapid survey of surfaces, tools, containers, and the like.

In the prior art it has been the practice to survey areas or points of contamination with direct current ion chamber instruments. Pulse type alpha survey instruments have several intrinsic advantages over D. C. ion chamber instruments; their response is faster thus making rapid surveys possible. They are more sensitive since each alpha particle is "heard," and they make possible the detection of low levels of alpha activity in the presence of high beta and gamma activity.

Due to the high amplifier gain required and attendant microphonics, pulse ion chambers have been found impractical as alpha survey instruments. Since the proportional counter may be used with an amplifier of much lower gain, microphony is negligible and an alpha survey pulse counter of this type is quite feasible.

Applicant with a knowledge of these problems has for an object of his invention the provision of an alpha survey probe which is a proportional type pulse counter sensitive to individual alpha particles, and which operates in air at atmospheric pressure with instantaneous response.

Applicant has as another object of his invention the provision of a survey instrument wherein alpha contamination can be detected in the presence of high beta and gamma backgrounds.

Applicant has as a further object of his invention the provision of a survey instrument employing interchangeable, compact, non-microphonic probes for the detection of alpha particles, slow and fast neutrons, beta particles and gamma radiations, by changing the operating potential to correspond to the selected probe.

Other objects and advantages of my invention will appear from the following specification and accompanying drawings and the novel features thereof will be particularly pointed out in the annexed claims.

In the drawings, Fig. 1 is a schematic of the system employing my improved survey instrument for the detection of radiations. Fig. 2 is a perspective of my improved survey instrument with the slot or window extending upwardly. Fig. 3 is a perspective of the same instrument in normal operative position, with the window extending downwardly. Fig. 4 is a partial sectional view of the same instrument taken along the line 4—4 of Fig. 3. Fig. 5 is an exploded perspective of the same instrument with the various elements pulled apart in spaced relation. Fig. 6 is a sectional detail view of a modified form of my improved survey instrument.

Gas amplification in a proportional counter is a function of the voltage on its center wire; therefore, it would be desirable to use in the counter a polyatomic gas like methane which exhibits stable gas amplification essentially exponential with voltage across the counter. However, counters filled with this gas and covered with a thin nylon window transparent to alpha particles rapidly change their characteristics due to the slow diffusion of the gas through the thin membrane. It was found necessary, therefore, to use air at atmospheric pressure as the counter gas. Since the gas amplification factor of air increases extremely rapidly with voltage on the center wire, it is necessary to have a well stabilized high voltage supply and a reproducible means of setting the operating voltage on the counter.

While the probe coupled directly to the amplifier exhibits a much flatter operating characteristic when the center wire voltage is plotted against relative counting rate than when it is connected through a cable, it has been found to be entirely satisfactory to employ this latter unorthodox type of coupling. In this way a more compact form of probe can be made since it eliminates the necessity for mounting the first amplifier stage on the probe.

Referring to the drawings in detail, an elongated hollow cylindrical body portion 4 has a longitudinal slot 18 therein. The edges of the slot are grooved for the reception of the edges of a slide or frame 2. To prevent the ingress of dirt and moisture into the body, a thin membrane 1 of suitable material, such as 0.2 mil nylon, is cemented or otherwise secured to one face of the brass frame 2. A highly transparent metal screen mesh 8 is soldered or otherwise secured to the opposite face of the slide. In this way the slide may be inserted in or removed from the body portion by simply sliding in the groove 19. Also other slides or frames may be substituted for the one removed.

The chamber formed in body 4 is of the proportional counter type with the metal inclosure being preferably 1½ inches in diameter and the slot therein being about 1 inch in width. The perforated metal shields inserted over the nylon screen serve to vary the geometry factor and thereby permit the detection of various sources having a wide range of counts.

The cable 16 connecting the probe to the amplifier 20 must have a dielectric of high volume resistivity and low surface leakage characteristics. Certain commercial types of concentric conductor cable having polyethylene insulation have been found satisfactory for this purpose, and ¼ inch conductors with solid or semi-solid dielectric have been successfully used.

A fine tungsten wire 9 of about 1 mil size is coaxially mounted in the body 4 on suitable insulators 3, 21. Insulator 3 has a threaded extension which threads into an opening in one end of body 4 while insulator 21 is carried by connector receptacle 12 which is mounted on the other end of body 4 by means of screws 15 that pass through openings in the flange of receptacle 12 and seat in the wall of body 4. Wire 9 passes through a hook extension on insulator 3 and is twisted about the hook. Solder may be applied to the hook to act as an additional holding means. The opposite end of wire 9 is joined to insulator 21 through anchor 11 and spring 10. The connector 12 has a socket for the reception of the contacts on plug 13. It will be understood that the central contact 17 acts as the conductor for the central wire 9 while the outer shell acts as a conductor for the body 4. Insulator 14 is interposed between them. Screws 15 serve to maintain parts of the plug in assembled relation, 5 is a nipple which screws in plug 13 and engages contact 17, and 6 is an adjusting nut. The handle 7, preferably of lucite material, is threaded onto the nipple 5 and is locked in position by the nut 6. Cable 16 passes through a bore in handle 7 so that the inner conductor is electrically connected through the nipple 5 to the contact 17 and the outer conductor is connected to the plug 13 through nipple 5. It will be understood that the two parts of the nipple mentioned above are insulated from each other. Other appropriate types of connectors may be used, provided adequate insulation, such as polystyrene dielectric with long leakage paths is employed.

Referring particularly to Fig. 1, the probe A is connected to amplifier 20 through cable 16, and the amplifier 20 feeds a pulse circuit 22 which is coupled into head phones or a speaker 23. When the probe A is moved over a contaminated area, the loud speaker or head phones "pop." At low levels of activity only a few "pops" are produced, but at increasingly higher levels of contamination, a continuous sound is heard whose frequency rises with increased contamination.

Since the loud speaker response is instantaneous and since the ear can readily distinguish relative order of contamination from the frequency, it is possible to make rapid surveys by moving the probe quickly over objects and surfaces. The use of a rate meter is optional as the loud speaker indicates areas which must be decontaminated. However, where a record of the contamination must be made, a rate meter mounted on the panel or the handle of the probe indicates the magnitude of alpha activity.

The amplifier 20 is conventional and is preferably a three stage amplifier employing pentode tubes biased to operate non-linearly. The pulse or rate meter circuit 22 may be of the type employing a thyratron such as is disclosed in the copending application of C. R. Marsh, Ser. No. 56,847, which matured into Patent No. 2,550,488, and the power supply and loud speaker circuits are conventional. None of these elements, however, form any part of my invention.

Various sizes of probes of the type shown in Fig. 3 are applicable. Probe diameters from one-quarter inch to one and one-half inch may be used. The one-fourth diameter probe is useful for detecting contamination in small diameter vessels like test tubes and centrifuge cones. Without any covering over the face of this probe, alpha particles of 3.7 cm. range can be detected when the probe face is 3.5 cm. away from the source. No covering is usually used on this size probe. For routine surveys the 1½ inch probe has been found most useful.

Since the background of an uncontaminated probe is about one "pop" per minute, very low intensities of alpha activity can be detected. Thus all parts of the hands, face, or clothing can be scanned rapidly, and the contamination, if present as a point source, can be localized to an area one-half inch square.

With a six mesh highly transparent brass screen covered with nylon over the face of the probe, alpha activities from a few disintegrations per minute to 100,000 disintegrations per minute can be readily measured. If it is necessary to determine quantitatively higher levels of alpha activity than this, a screen of lower transparency can be inserted into the probe, thus reducing the geometry. With a suitable screen activity up to $10^8$ disintegrations per minute can be measured.

Because of the light weight and compact design of the probe it is possible to survey balance pans, hood walls, interiors of centrifuges, test tubes, laundry, glassware, drawers, and many other places previously found inaccessible for alpha survey. The alpha probe itself is not microphonic, but single pulses can be obtained when the cable is struck a sharp blow or is dragged too briskly. These pulses are due to electrostatic charges generated in the dielectric and are common to all dielectrics tested: polyethylene, polystyrene, and rubber. In practice however, the cable noise is inconsequential.

The modification of Fig. 6, used for beta and gamma detection, is similar to that previously described in connection with alpha particle detection. The body portion 6' has a partition therein dividing the chamber into two parts. The inner-conductor 5' is preferably a 1 mil tungsten wire supported by insulators 2', 2' of Pyrex glass. One of the insulators is mounted in the wall of the partition and a conductor 8' serves to join the inner-conductor 5' to a connector 1' mounted on the body 6' of the probe by appropriate screws 9' which pass through the flange and thread into the body 6'. Bridging the partition and one end of the body 6' and covering the slot in the body, to provide a sealed chamber, is a foil strip 4' of 1½ mil aluminum foil. Mounted on the outside of the foil strip is a protective strip 3' maintained thereon by screws 10' which pass through the screen and thread into the body 6'. A plug 7' threaded into one end of the body 6' serves as a valve to permit communication with the chamber defined or enclosed by body 6'. In this way methane or other gas or vapor may be fed to the chamber and sealed therein by turning the threaded plug 7 to open, close or restrict the orifice. Connections are made to the cable in a manner very much like that previously described in connection with other modifications, since the plug is grounded on the case. In this and other arrangements the body 6' is at ground potential constituting a shield. The screen tends to maintain uniformity of the electric field about the central conductor. The central conductor 5' is usually maintained at high potential.

Slow neutrons are detected with a boron coated cylindrical chamber 1½ inches, outside diameter, and 10 inches long. The chamber is filled to one atmosphere with methane and operates as a proportional counter with a one mil tungsten center wire. The operating voltage is about 2400 volts. The chamber is connected to the cable and amplifier, and at the proper adjustment of the operating voltage the chamber should be sensitive to a slow neutron source but insensitive to a gamma source whose intensity is somewhat higher than the maximum anticipated in the survey.

Fast neutrons are detected with the same chamber by simply slipping over it a cylindrical cadmium can, the inside of which is lined with one inch of paraffin or polyethylene.

Having thus described my invention, I claim:

1. A survey instrument of the character described comprising an elongated hollow metal casing, a conductor disposed within and insulated from the casing, a window in said casing for exposing the conductor to external electrical influences, an open frame slidably positioned over said window, a shield of thin porous material carried by said frame and enclosing it for resisting the ingress of contamination, and a metal mesh mounted on said frame and substantially co-extensive with said shield for preserving substantial uniformity of electrical field about the conductor.

2. A proportional type pulse counter comprising an elongated hollow metal casing defining a chamber, a conductor disposed within the casing and extending lengthwise thereof, said conductor being insulated therefrom, a window extending longitudinally of the casing for exposing the conductor to external electrical influences and to permit the passage of air, mounting means slidably carried by the casing and extending along the window, a shield of thin porous material mounted on said mounting means and extending across said window for reducing the ingress of contamination, and a metal grating extending along said shield to cover the window for cooperation with the casing to preserve substantial uniformity of the electrical field about the conductor, said grating including a series of uniformly spaced metal strands.

CASIMER J. BORKOWSKI.

References Cited in the file of this patent

UNITED STATES PATENTS

| Number | Name | Date |
|---|---|---|
| 2,161,979 | Rovner | June 13, 1939 |
| 2,465,821 | Smoluchowski | Mar. 29, 1949 |
| 2,532,956 | Simpson | Dec. 5, 1950 |

OTHER REFERENCES

Korff, Electron and Nuclear Counters, Theory and Use, D. Van Nostrand Co., April 1946, pp. 129, 130.